LOUIS F. NEAGLES'
IMPROVEMENT IN
REFLECTING MIRRORS

71320

PATENTED
NOV 26 1867

WITNESSES
Frank Garde
Francis D. Pastorius

INVENTOR
Louis F. Neagle

United States Patent Office.

LOUIS F. NEAGLE, OF PHILADELPHIA, PENNSYLVANIA.

Letters Patent No. 71,320, dated November 26, 1867.

---

IMPROVED ADJUSTABLE MIRROR.

---

The Schedule referred to in these Letters Patent and making part of the same.

---

TO ALL WHOM IT MAY CONCERN:

Be it known that I, LOUIS F. NEAGLE, of the city and county of Philadelphia, and State of Pennsylvania, have invented an Improved Combination of Reflecting Mirrors for Bureaus, &c.; and I do hereby declare that the following is a full, clear, and exact description of the same, reference being had to the accompanying drawing, and to the letters of reference marked thereon.

My invention consists in providing a dressing-bureau with an additional mirror, so that a person dressing can with equal facility dress the hair both back and front, arrange the toilet, and observe generally the outward appearance, without changing or shifting position. The said additional glass is constructed, arranged, and operated substantially as is hereinafter shown and described. On reference to the accompanying drawing, making a part of this specification—

Similar letters refer to similar parts in the several views.

Figure 1:
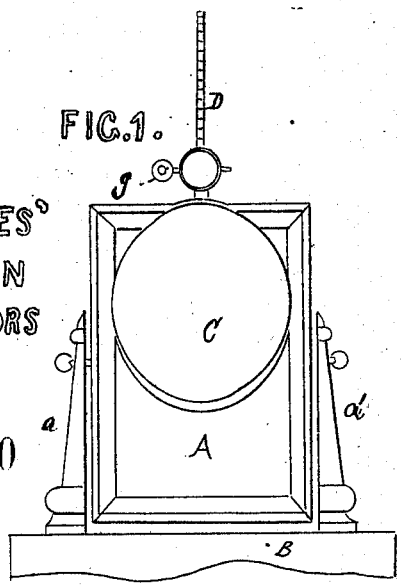
Figure 1 is a front view of the top of a dressing-bureau B, showing the position of the additional or reflecting mirror C, when in use, relative to the bureau-mirror A.

A is an ordinary bureau-mirror, vibrating on the uprights $a\ a'$, fixed to the top of the bureau B. C is a reflecting mirror, attached to an adjusting-rod, D, which takes through the head $b$, on the end of the vibrating-rod $c$. Fixed to the back of the mirror is the rod $d$, which answers the double purpose of adjusting the inclination of the mirror to the top of the bureau, and sustaining it, and also for carrying and swivelling the rod $c$, to which the mirror is suspended, as shown in fig. 1. The reflecting mirror is vibrated to directly opposite the mirror A. The person dressing stands in the space contained between them, in front of the bureau. The bureau-mirror reflects the front of the person, and the reflecting mirror C the back, which it reflects on to the mirror A, thereby enabling the person to survey both front and back at one and the same time.

Figure 2:
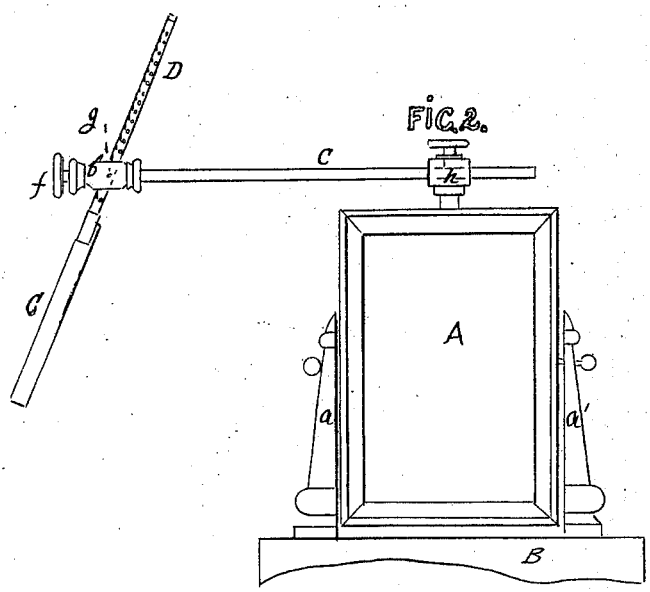
Figure 2 is also a view of the top of a dressing-bureau, showing the position of the reflecting mirror C, when not in use.

After the reflecting mirror has been used, the tightening-screw $e$ is loosened, to allow the vertical rod $d$ to vibrate, which carries the mirror by a circular motion to the side of the bureau, as shown in fig. 2, where it is out of the way, and safe from accidents which might otherwise happen to it.

Figure 3:
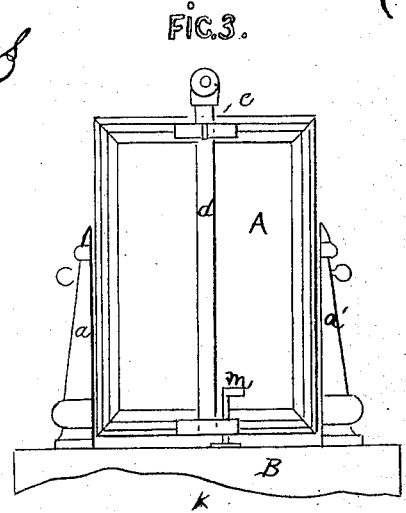
Figure 3 is a back view of the bureau and its mirror A.
Figure 4:
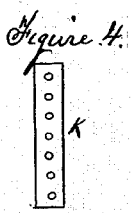
Figure 4 is a plan view of the adjusting-plate $k$.

The rack D, by which the reflecting mirror is suspended from the head $b$ of the rod $d$, adjusts its height relative to the top of the bureau; the set-screw $f$, which takes into the teeth of the ratchet, preserves its angularity; while the pin $g$, taking through the holes in it, and corresponding holes in the head, prevent its lifting and settling. A set-screw in the head $h$ permits the rod $c$ to slide to and fro through it, and thereby regulate the distance of the reflecting mirror C from the mirror A. To adjust the angle of the mirror A to the top of the bureau, I employ a plate, $k$, figs. 3 and 4, fastened to the top of the bureau. A latch, $m$, shown in fig. 3, takes into corresponding holes in it. When the mirror A is set at an angle to the bureau the gravity of the reflecting mirror causes it to vibrate around the rod $d$ at will, in seeking its lowest point. To prevent this, and hold it in its required position, I employ a thumb or set-screw, $e$, which takes into a strap on the back of the mirror, and effectively holds the rod $d$ from turning, by which means the reflecting mirror is held.

What I claim as my invention, and desire to secure by Letters Patent, is—

The mirrors A and C, adjusting-rod D, vibrating-rod $c$, head $b$, rod $d$, set-screw $f$, pin $g$, head $h$, plate $k$, and the latch $m$, when combined and arranged as set forth.

In testimony whereof, I hereunto sign my name to this specification in presence of two subscribing witnesses.

LOUIS F. NEAGLE.

Witnesses:
FRANK GARDE,
W. W. DOUGHERTY.